United States Patent
Li et al.

(10) Patent No.: US 8,447,191 B2
(45) Date of Patent: *May 21, 2013

(54) COMPENSATION OF OPTICAL TRANSMISSION IMPAIRMENTS USING DIGITAL BACKWARD PROPAGATION

(75) Inventors: Guifang Li, Oviedo, FL (US); Eduardo Mateo, Orlando, FL (US); Fatih Yaman, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/728,854

(22) Filed: Mar. 22, 2010

(65) Prior Publication Data

US 2010/0239262 A1 Sep. 23, 2010

Related U.S. Application Data

(60) Provisional application No. 61/161,867, filed on Mar. 20, 2009.

(51) Int. Cl.
*H04B 10/06* (2006.01)

(52) U.S. Cl.
USPC ............ 398/208; 398/81; 398/158; 398/159; 398/212; 398/214

(58) Field of Classification Search
USPC .............................. 398/81, 158, 159, 208–214
See application file for complete search history.

(56) References Cited

U.S. PATENT DOCUMENTS

| | | | |
|---|---|---|---|
| 7,672,599 B2 * | 3/2010 | Essiambre et al. | 398/193 |
| 8,204,389 B2 * | 6/2012 | Li et al. | 398/208 |
| 2010/0165348 A1 * | 7/2010 | Fleischer et al. | 356/458 |

OTHER PUBLICATIONS

Li et al: "Electronic post-compensation of WDM transmission impairments using coherent detection and digital signal processing", Optics Express, vol. 16, No. 2, Jan. 21, 2008.*

* cited by examiner

*Primary Examiner* — Li Liu
(74) *Attorney, Agent, or Firm* — Thomas|Horstemeyer, LLP

(57) ABSTRACT

Systems and method of compensating for transmission impairment are disclosed. One such method comprises receiving a wavelength-division multiplexed optical signal. The received optical signal has been distorted in the physical domain by an optical transmission channel. The method further comprises propagating the distorted optical signal backward in the electronic domain in a corresponding virtual optical transmission channel. The backward propagation fully compensates for fiber dispersion, self-phase modulation, and cross-phase modulation (XPM) and partially compensates for four-wave mixing (FWM).

15 Claims, 7 Drawing Sheets

US 8,447,191 B2

COMPENSATION OF OPTICAL TRANSMISSION IMPAIRMENTS USING DIGITAL BACKWARD PROPAGATION

CROSS-REFERENCE TO RELATED APPLICATIONS

This application claims priority to U.S. Provisional Application having Ser. No. 61/161,867, filed Mar. 20, 2009, which is hereby incorporated by reference herein in its entirety.

FIELD OF THE DISCLOSURE

The present disclosure relates to compensating for optical transmission impairments in the electronic or software domain.

BACKGROUND

Channel impairments in transmission systems result in signal degradation and thus limit the carrying capacity of these systems. In optical transmission systems, some of these impairments are linear (e.g., fiber chromatic dispersion or CD) and some are non-linear (e.g., cross-phase modulation and four-wave mixing caused by the Kerr effect). To minimize the effect of impairments, transmission systems may include various types of compensation systems or devices. A signal can be modified before, or as part of, transmission to account for the effect of impairment (a technique known as pre-compensation). Conversely, knowledge about an impairment can be used to modify a received signal to compensate for the impairment (a technique known as post-compensation). Such compensation systems or devices can be implemented in the optical domain or in the electrical/electronic domain.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The inventive techniques described herein compensate for optical distortion, using backward propagation in the electrical domain. Specifically, digital backward propagation in the digital domain is used to convert the received optical signal into an estimate of the transmitted signal. This digital backward propagation process involves solving one or more equations which model a virtual optical transmission channel corresponding to the physical optical transmission channel. The model uses channel parameter values that are opposite to ("backward" from) the physical channel parameters. Applying the model to the received optical signal thus compensates for impairments produced by the physical channel.

Figure 1:
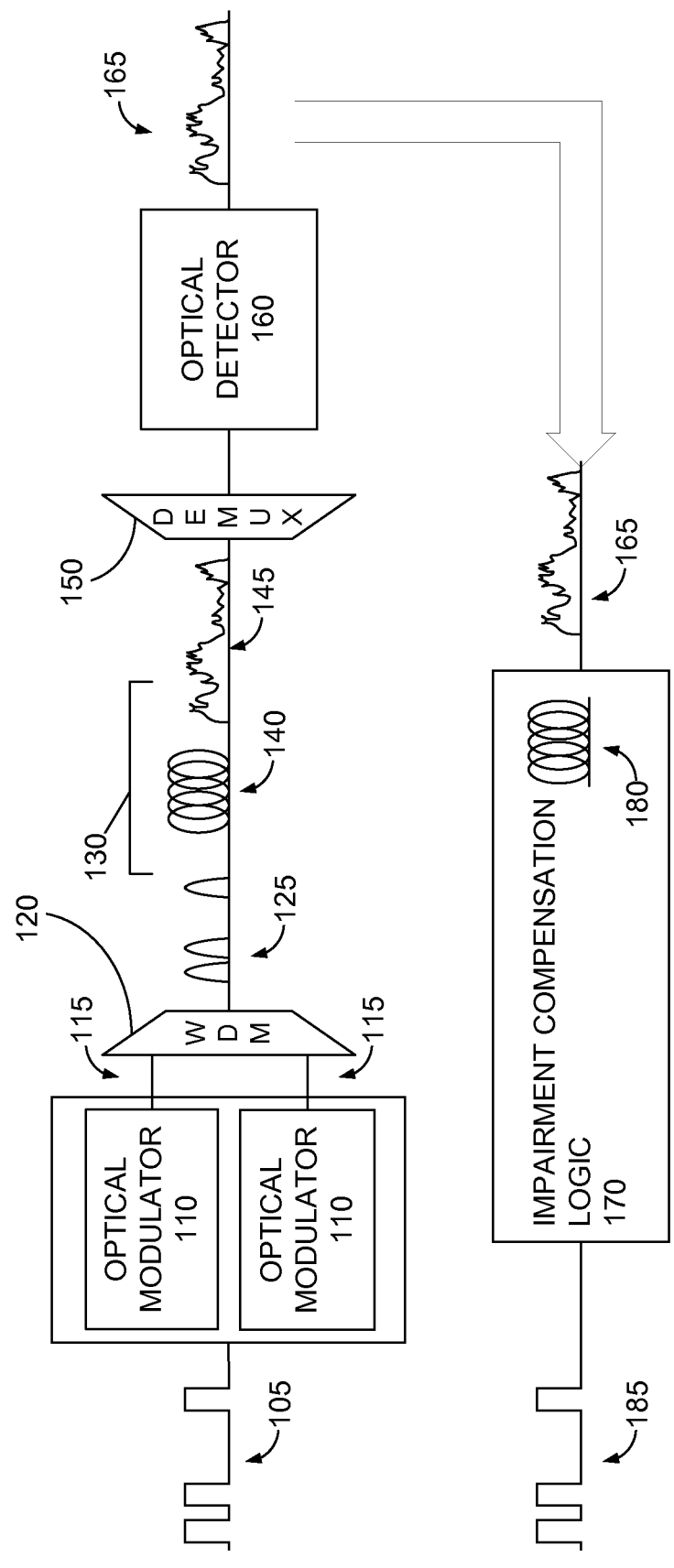
FIG. 1 is a system model diagram of an optical communication system including an embodiment of fiber impairment compensation logic.

FIG. 1 is a system model diagram of an optical communication system including an embodiment of impairment compensation logic. Transmitted data is carried by an electrical signal 105, which is provided to a set of optical modulators 110. Each optical modulator 110, operating at a corresponding frequency, produces a (modulated) optical signal 115, and these modulated optical signals 115 are multiplexed by wave division multiplexer 120 to produce multiplexed optical signal 125.

Optical signal 125 travels through an optical channel 130, which includes optical fiber 140. Optical fiber 140 introduces various types of distortion, resulting in a distorted optical signal 145. Distorted optical signal 145 is demultiplexed by frequency demultiplexer 150 and provided to one or more optical detectors 160, which convert the distorted optical signal to a signal in the electrical domain, Distorted electrical signal 165 is processed in the electrical (digital) domain by impairment compensation logic 170 to remove distortion produced in the optical (physical) domain. Impairment compensation logic 170 operates by modeling the characteristics of optical fiber 140 in a virtual optical fiber 180. The output of impairment compensation logic 170 is a compensated electrical signal 185. Carried within the demultiplexed and compensated electrical signal 185 is data which is a replica (or near replica) of the originally transmitted data.

Impairment compensation logic 170 utilizes a virtual fiber model which accounts for, and reverses the effect of, various impairments introduced by optical fiber 140. Examples of such impairments include: fiber dispersion; self-phase modulation or SPM (an intra-channel impairment); cross-phase modulation or XPM (an inter-channel impairment); and four-wave mixing or FWM (another inter-channel impairment). Different types of impairments can be accounted for using different models. A form of selective compensation is described herein which fully compensates for fiber dispersion, SPM, and XPM, as well as partially compensating for four-wave mixing. This technique compensates for FWM interaction on a channel-by-channel basis by considering the nonlinear interaction of the neighboring channels. Embodiments of impairment compensation logic 170 which perform partial FWM compensation, while also fully compensating for fiber dispersion, SPM, and XPM, are referred to herein as partial FWM compensation logic 170PF.

Figure 2:
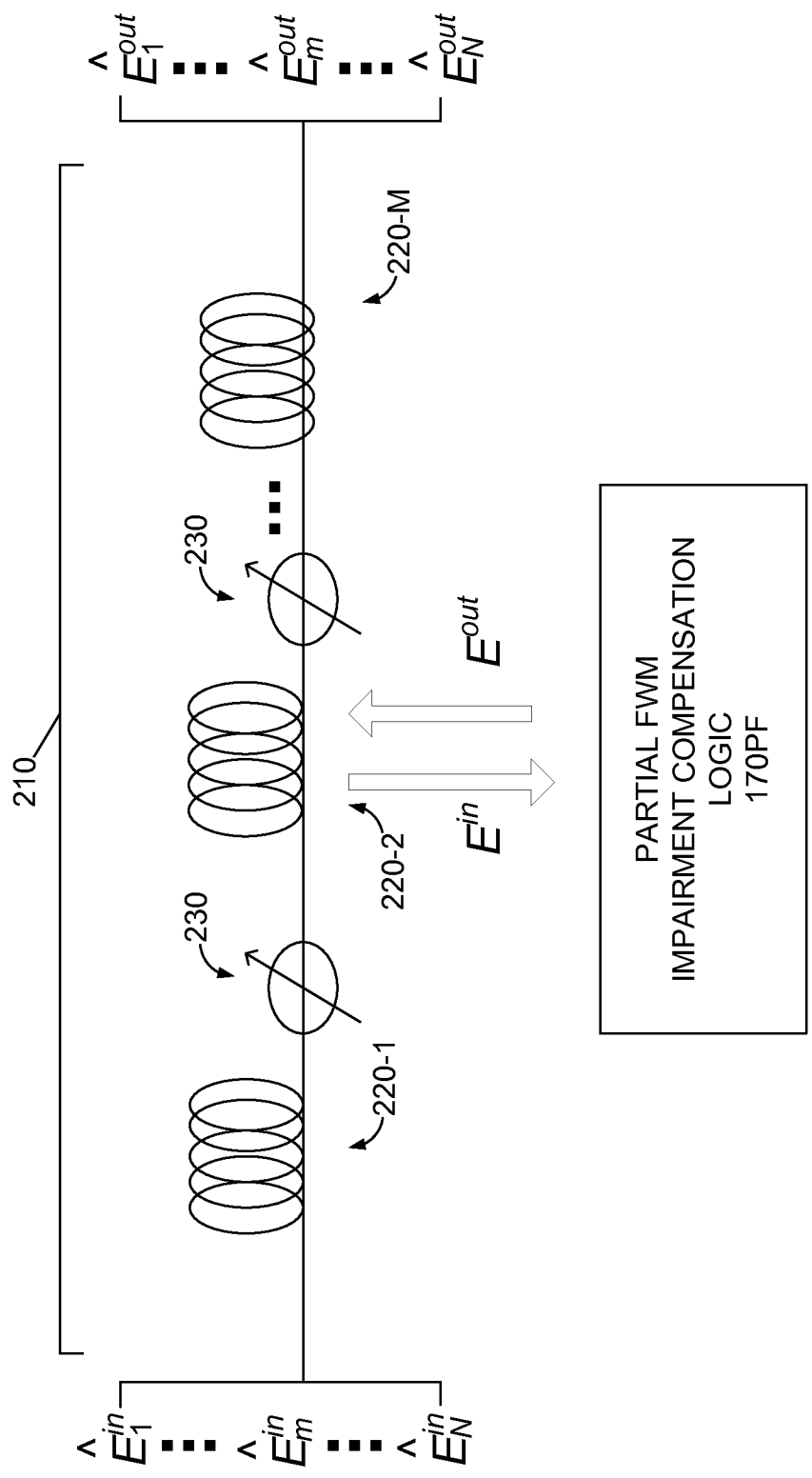
FIG. 2 is a system model diagram of one embodiment of a virtual fiber link used by some embodiments of the partial FWM impairment compensation logic of FIG. 1.

FIG. 2 is a system model diagram of one embodiment of a virtual fiber model used by some embodiments of partial FWM compensation logic 170PF. Virtual fiber link 210 includes multiple spans 220 (220-1, 220-2 . . . 220-M), divided by attenuators 230, where attenuators 230 compensate for optical amplifiers deployed between fiber spans. Multiple inputs $\hat{E}_1^{in} \ldots \hat{E}_N^{in}$ represent the N components, one for each wavelength, of the electric field of the received distorted electrical signal (165 in FIG. 1). Multiple outputs $\hat{E}_1^{out} \ldots \hat{E}_N^{out}$ represent the components electric field of the compensated electrical signal (185 in FIG. 1), after processing by partial FWM compensation logic 170PF.

Propagation of an optical field in fiber span 220 is governed by a z-reversed nonlinear Schrödinger equation (NLSE). The NLSE uses parameters which correspond to the characteristics of the physical optical fiber (140 in FIG. 1), including an absorption (loss) coefficient, a first-order chromatic dispersion parameter, a second-order chromatic dispersion parameter and a non-linear coefficient. The model compensates for physical fiber distortion by reversing the physical fiber parameters when solving the NLSE for each span, i.e., using parameter values that are the negative (opposite) of the actual fiber parameters. Since this is mathematically equivalent to reversing (negating) the sign of the spatial variable when solving the NLSE, the technique is known as "backward propagation".

A form of the back propagation NLSE which takes into account the total electrical field to compensate for all forms of fiber impairment is called T-NLSE. T-NLSE governs propagation of the total field including second and third order dispersion compensation and the full compensation of SPM, XPM and FWM. T-NLSE is given by:

$$T[E] = -\frac{\partial E}{\partial t} + \frac{\alpha}{2}E + \frac{i\beta_2}{2}\frac{\partial^2 E}{\partial t^2} - \frac{\beta_3}{6}\frac{\partial^3 E}{\partial t^3} + i\gamma|E|^2 E = 0 \quad \text{(Eq. 1)}$$

where, $\beta_j$ represents the j th-order chromatic dispersion parameter, $\alpha$ is the absorption coefficient, $\gamma$ is the nonlinear parameter, and t is the retarded time frame. Other impairments including scattering (Raman, Rayleigh and Brillouin scattering) can also be included in the T-NLSE.

A form of selective compensation which omits the effect of four-wave-mixing (FWM) in backward propagation is achieved by introducing the electric field expression E into Eq. 1, expanding the $|E|^2$ term and neglecting the terms related to FWM. This results in the following system of coupled equations referred to herein as "coupled NLSE" (C-NLSE):

$$C[E] = -\frac{\partial \hat{E}_m}{\partial z} + \frac{\alpha}{2}\hat{E}_m + K_{1m}\frac{\partial \hat{E}_m}{\partial t} + \quad \text{(Eq. 2)}$$
$$K_{2m}\frac{\partial^2 \hat{E}_m}{\partial t^2} - K_{3m}\frac{\partial^3 \hat{E}_m}{\partial t^3} + i\gamma\left(\sum_q^N |\hat{E}_q|^2 - |\hat{E}_m|^2\right)\hat{E}_m = 0$$

where, $K_{1m}=m\beta_2\Delta\omega-m^2\beta_3\Delta\omega^2/2$, $K_{2m}=i\beta_2/2-m\beta_3\Delta\omega/2$ and $K_{3m}=-\beta_3/6$. C-NLSE (Eq. 2) thus describes the backward propagation of fiber channels where only dispersion, self-phase modulation and cross-phase modulation are compensated (i.e., FWM is not compensated for). Further details of various embodiments of fiber impairment compensation logic which solve C-NLSE are described in U.S. Ser. No. 12/351,444, entitled "Electronic Post-Compensation of Optical Transmission Impairments Using Digital Backward Propagation" (U.S. Pat. Pub. 20090214215), which is hereby incorporated herein in its entirety.

Although C-NLSE reduces the amount of computational resources as compared to T-NLSE by omitting compensation for FWM, FWM can substantially impair the signal in low dispersion regimes because of an increased degree of phase matching. Therefore, another form of selective compensation is described herein which partially compensates for (rather than omits) the effect of FWM. This technique compensates for FWM interaction on a channel-by-channel basis by considering the nonlinear interaction of the neighboring channels. This interaction is captured by rewriting Eq. 2 as $$EC[\hat{E}_m] = C[\hat{E}_m] + F_{3m} + F_{5m} = 0 \quad \text{(Eq. 3)}$$

where $F_{3m}=2\hat{E}_{m+1}\hat{E}_{m-1}\hat{E}_m^*$, $$F_{5m}=\hat{E}_{m+1}^2\hat{E}_{m+2}^* + \hat{E}_{m-1}^2\hat{E}_{m-2}^* + 2\hat{E}_{m-1}\hat{E}_{m+1}\hat{E}_{m+1}^* + 2\hat{E}_{m+1}\hat{E}_{m-2}\hat{E}_{m-1} + 2\hat{E}_{m+2}\hat{E}_{m-2}\hat{E}_m^* \quad \text{(Eq. 4)}.$$

$F_3$ represents the FWM interaction of two neighboring channels, whereas $F_5$ represents the interaction of four neighboring channels. The system of coupled equations in Eq. 3 is referred to herein as "enhanced coupled NLSE" or EC-NLSE.

EC-NLSE does not significantly add to computational complexity as compared to C-NLSE, since only a small number of FWM terms are considered by EC-NLSE. However, these terms are highly phase-matched so the compensation achieved for this additional cost is significant.

As noted above, partial FWM compensation logic 170PF uses a backward propagation process to solve the EC-NLSE for the various fiber spans 220. Because the dispersive and nonlinear contributions to impairment are considered to be independent within a relatively short propagation length, logic 170PF decomposes the backward propagation into a series of iterations or steps. Some embodiments of logic 170PF use the split-step method (SSM) to solve the EC-NLSE. The split step method (SSM) is a technique for solving nonlinear equations in this step-wise manner.

Figure 3:
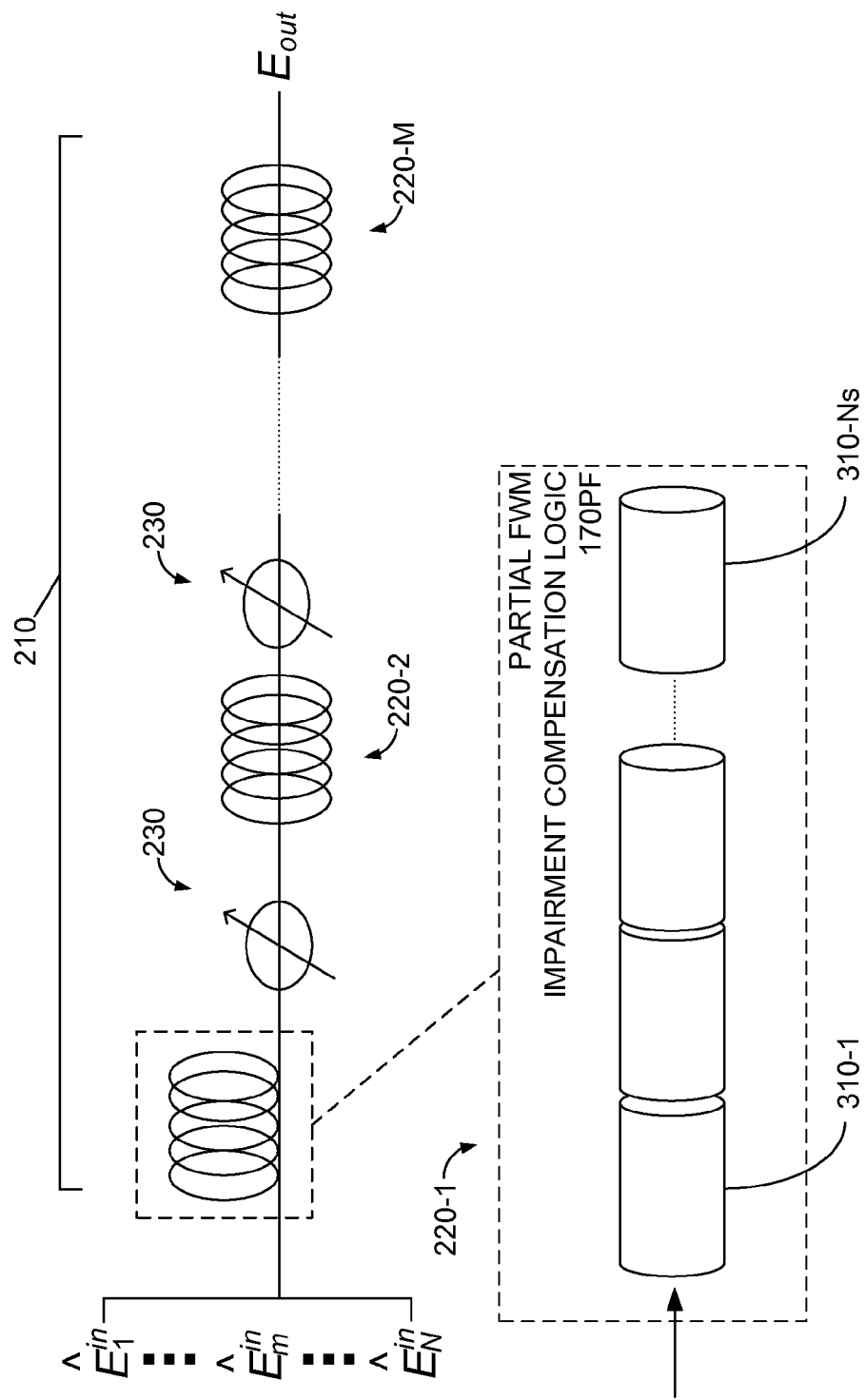
FIG. 3 is a block diagram of a virtual fiber model used by some embodiments of the partial FWM compensation logic of FIG. 1.

FIG. 3 is a block diagram of a virtual fiber link in which partial FWM compensation logic 170PF uses an SSM in order to solve the EC-NLSE. Virtual fiber link 210 includes M spans (220-1 . . . 220-M). Each span is treated as a series of iterations or steps 310-1 . . . 320-Ns. Some embodiments of virtual fiber link 210 also include virtual attenuators, in which case the virtual attenuator is modeled with an attenuation parameter that balances the gain of the corresponding optical amplifier in the physical fiber link.

Figure 4:
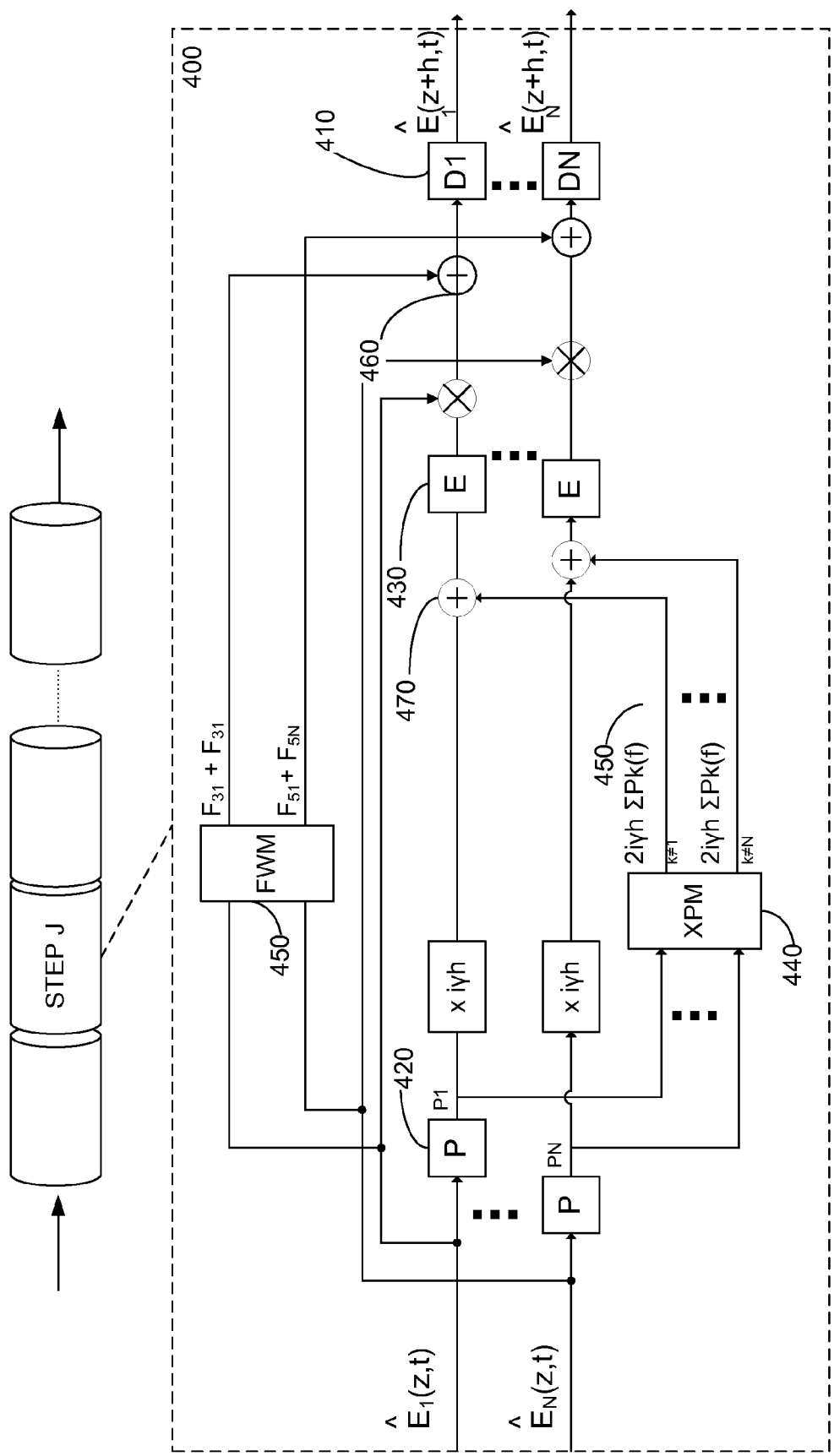
FIG. 4 is a block diagram of a module which implements a single step for the enhanced coupled nonlinear Schrödinger equation (EC-NLSE) using one embodiment of an split step model (SSM).

FIG. 4 is a block diagram of a module which implements a single step for the EC-NLSE using one embodiment of an SSM. EC-NLSE step module 400 uses several different types of operators, including a dispersion operator 410, a power operator 420, and an exponential operator 430. Step module 400 also includes an XPM calculation unit 440 and an FWM calculation unit 450. The operators and units are coupled, as shown in FIG. 4, to receive as input the electrical field components $\hat{E}_1$ . . . $E_N$, and to perform the next step j of compensation. Step module 400 thus produces the output electrical field $\hat{E}_1$ . . . $E_N$, which becomes input for the next step j+1. While FIG. 4 shows a data path for $\hat{E}_1$ and another data path for $E_N$, it should be appreciated that module 400 includes an instance of the data path for each frequency component, 1 . . . N.

Step module 400 uses a sum operation 460 at each sub-step in order to include the FWM contribution on each channel, as calculated by an FWM calculation unit 450. Similarly, step module 400 uses a sum operation 470 at each sub-step in order to account for the XPM calculation on each channel, as calculated by XPM calculation unit 440.

Power operator 420 implements the function $P(x)=|x|^2$, and exponential operator 430 implements the function $E(x)=\exp(i\gamma xh)$, where h is the step size. Dispersion operator 440 implements $D_m(x)=F^{-1}[H_m F(x)]$, where F represents the Fourier Transform of x. The transfer function for fiber dispersion and loss is $$H_m(\omega) = \exp\left[\left(\frac{\alpha}{2} + i\beta_2\frac{(\omega-m\Delta\omega)^2}{2} + i\beta_3\frac{(\omega-m\Delta\omega)^3}{6}\right)\frac{h}{2}\right].$$

It should be appreciated that dispersion operator 410 can be implemented in various ways, in either the frequency domain (e.g., overlap-and-add method, overlap-and-save method) or the time domain (e.g., finite impulse response (FIR) filter, infinite impulse response (IIR) filter). This example uses the non-symmetric SSM configuration, but the symmetric configuration and other configurations with sub-step iterations are also within the scope of this disclosure. Although the step module of FIG. 4 was described in conjunction with compensation logic for solving EC-NLSE, the same techniques can be used in solving C-NLSE by omitting FWM calculation unit 450.

The version of the split-step method implemented by step module 400 to solve EC-NLSE uncouples the linear and nonlinear contributions on EC-NLSE over a short distance. This version is accurate provided the step size h is shorter than the minimum walk-off length between channels, i.e., $h < \beta_2 (N-1)/\Delta\omega$, where $\Delta\omega = 2\pi\Delta f$ and $\Delta f$ is channel spacing.

An enhanced variation of a single step will now be described, one which takes into account the effect of dispersive walk-off between WDM channels when solving EC-NLSE. The nonlinear phase shift $\phi_m$ (including contributions from SPM and XPM) is defined as:

$$\phi_m(z+h, t) = \gamma \int_z^{z+h} |E_m(z, t)|^2 \, dz + 2\gamma \sum_{k \neq m} \int_z^{z+h} |E_k(z, t)|^2 \, dz. \quad \text{(Eq. 5)}$$

Step module 400 (described above) uses an approximation to Eq. 5 as follows:

$$\phi_m = \gamma |E_m|^2 h + 2\gamma \sum_{k \neq m} |E_k|^2 h \quad \text{(Eq. 6)}$$

In contrast, the representation used by the enhanced split-step includes the time delay caused by the dispersive walk-off:

$$\phi_m(z+h, t) = \quad \text{(Eq. 7)}$$
$$\gamma \int_z^{z+h} |E_m(z, t)|^2 \, dz + 2\gamma \sum_{k \neq m} \int_z^{z+h} |E_k(z, t - d_{mk}z)|^2 \, dz,$$

where $d_{mk} = \beta_2(\omega_m - \omega_k)$ is the walk-off parameter between channel m and channel k. This variation focuses on the XPM contribution to the phase shift by defining $$\phi_{m,XPM}(z+h, t) = 2\gamma \sum_{k \neq m} \int_z^{z+h} |E_k(z, t - d_{mk}z)|^2 \, dz \quad \text{(Eq. 8)}$$

Taking the Fourier transform of Eq. 8 results in the following expression for the XPM phase shift, now in the frequency domain, $$\phi_{m,XPM}(z+h, t) = 2\gamma \sum_{k \neq m} \int_z^{z+h} F\{|E_k(z, t)|^2\} \exp(i d_{mk} \omega z) \, dz \quad \text{(Eq. 9)}$$

Having factorized the walk-off effect, the above expression can be approximated by, $$\phi_{m,XPM}(z+h, \omega) \approx 2\gamma \sum_{k \neq m} F\{|E_k(z, t)|^2\} \int_z^{z+h} \exp(-i d_{mk} \omega z) \, dz \quad \text{(Eq. 10)}$$

In Eq. 10 the frequency domain optical intensities can be regarded as constant over the interval, provided that the step size is smaller than the distance after which dispersive effects over individual channels take place. In other words, the fastest dispersive variation of the WDM channels is no longer the walk-off (which has been factorized) and, as a consequence, the step-size can be significantly increased. Finally, by performing integration, Eq. 10 becomes, $$\phi_{m,XPM}(z+h, \omega) \approx \sum_{k \neq m} F\{|E_k(z, t)|^2\} W_{mk}(\omega), \quad \text{(Eq. 11)}$$

where $W(\omega)$ is a linear filter which takes into account the effect of the walk-off on the XPM nonlinear phase shift, i.e., $$W_{mk}(\omega) = 2\gamma \frac{1 - \exp[i\omega d_{mk} h]}{i\omega d_{mk}} \quad \text{(Eq. 12)}$$

Figure 5:
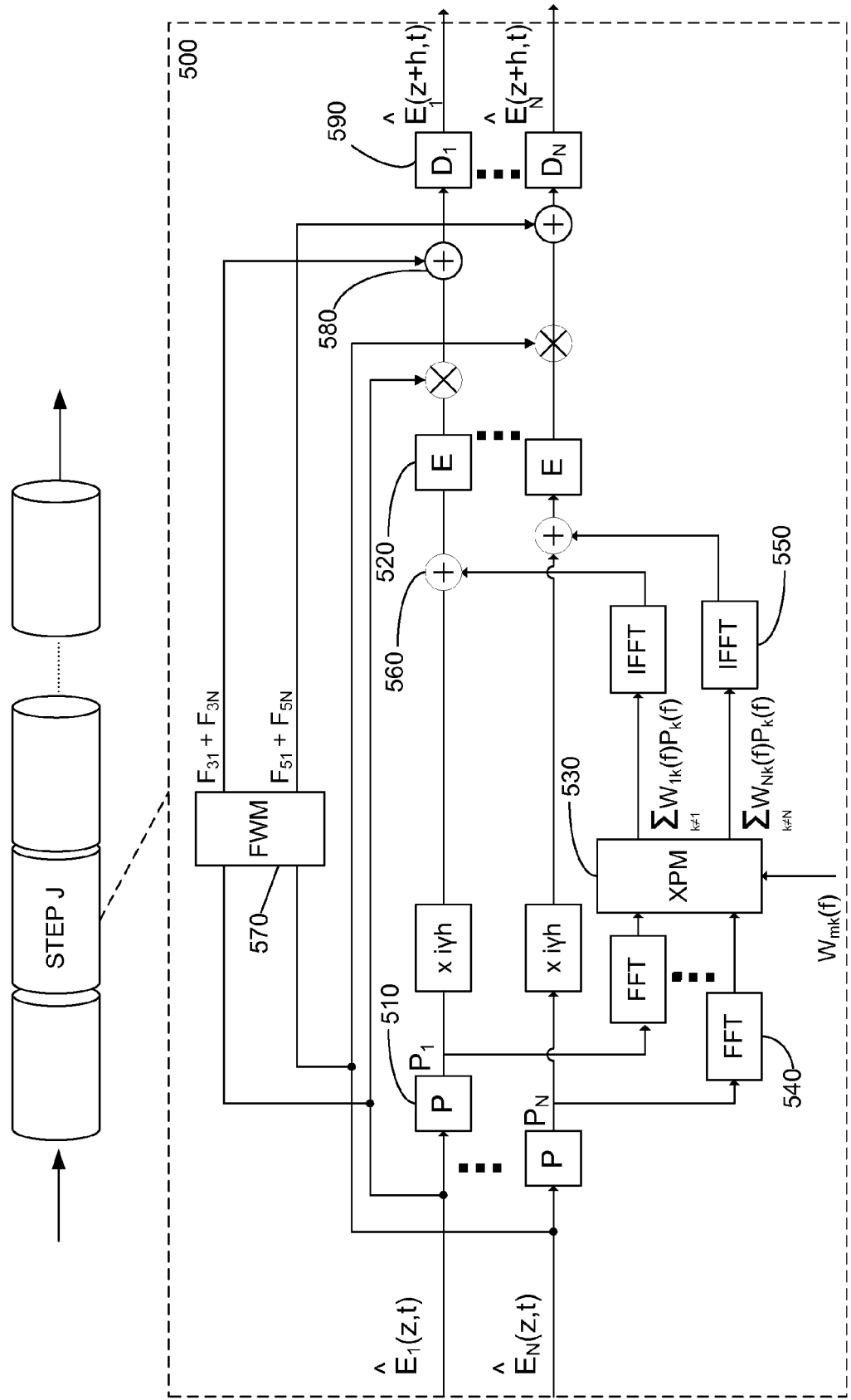
FIG. 5 is a block diagram of a module which implements a single step for the EC-NLSE using another embodiment of an SSM.

FIG. 5 is a block diagram of a module which implements a single step for the EC-NLSE using another embodiment of an SSM, one which takes into account the effect of dispersive walk-off as discussed above. Enhanced step module 500 uses several different types of operators, coupled as shown in FIG. 5. A power operator 510 is calculated as $P(x) = |x|^2$. An exponential operator 520 is calculated as $E(x) = \exp(x)$. The transfer function for fiber dispersion and loss is $$H_m(\omega) = \exp\left[\left(\frac{\alpha}{2} + i\beta_2 \frac{(\omega - m\Delta\omega)^2}{2} + i\beta_3 \frac{(\omega - m\Delta\omega)^3}{6}\right)\frac{h}{2}\right].$$

The XPM contribution on each channel is calculated by block 530. Before processing by XPM block 530, the signal is operated on by a fast Fourier transform (FFT) block 540. The signal is also operated on by an inverse FFT block 550 after processing by XPM block 530. Enhanced step module 500 uses a sum operation 560 at each sub-step in order to include the XPM calculation.

The FWM contribution on each channel is calculated by block 570, and the FWM contribution is included by sum operation 580. Finally, a dispersive operator 590 is applied. Dispersion operator 590 is calculated as $D_m(x) = \phi^{-1}[H_m \phi(x)]$, where $\phi(x)$ represents the Fourier Transform of x.

While enhanced step module 500 was described in conjunction with compensation logic for solving EC-NLSE, the enhanced split step of module 500 can also be used by compensation logic for solving C-NLSE. Although the step module of FIG. 5 was described in conjunction with compensation logic for solving EC-NLSE, the same techniques can be used in solving C-NLSE by omitting FWM calculation unit 450. Furthermore, the enhanced split step described above can be used with the generic split step method and is not limited to the split step Fourier method.

Figure 6:
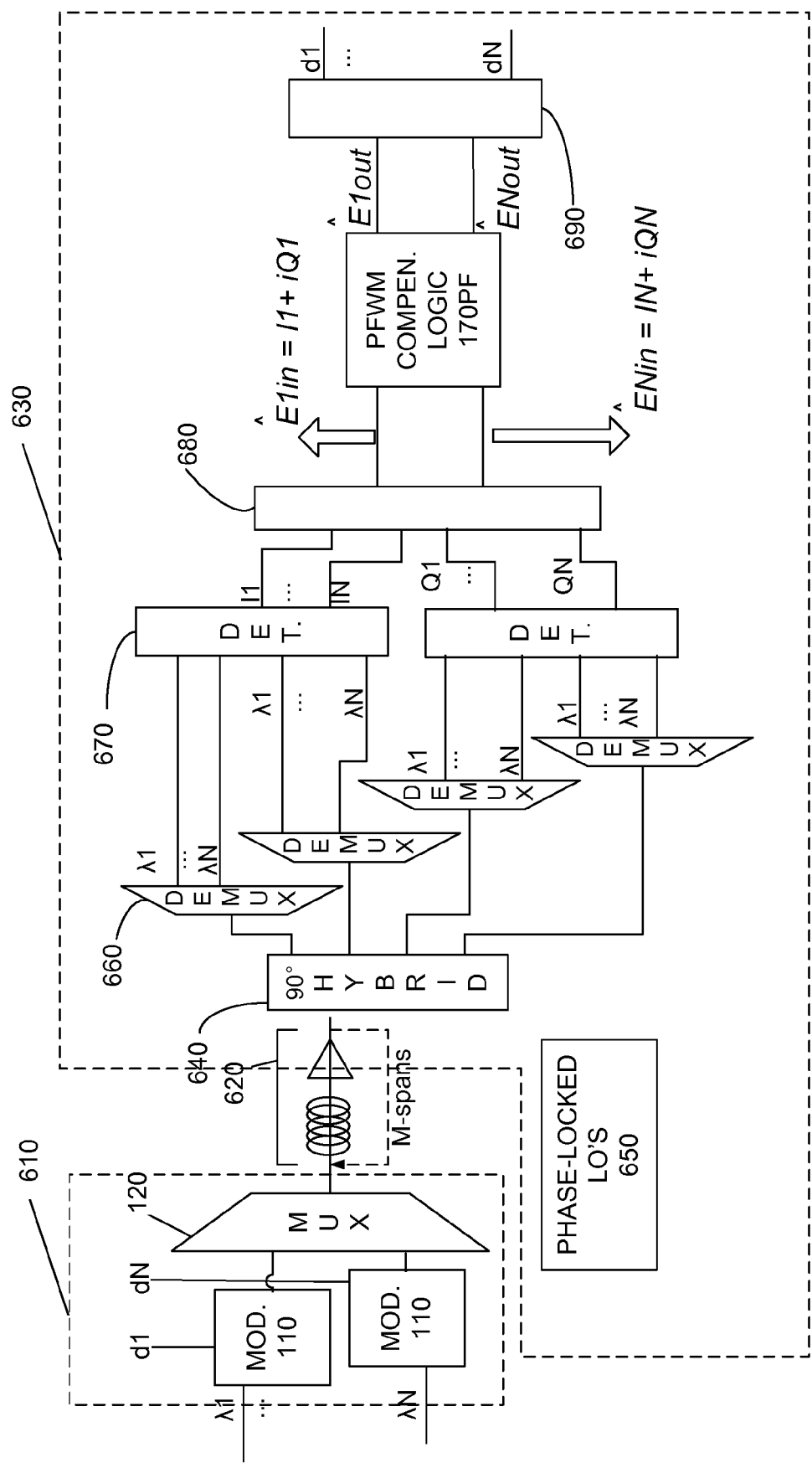
FIG. 6 is a block diagram of a wavelength division multiplexing (WDM) communication system including an embodiment of the partial FWM impairment compensation logic of FIG. 1.

FIG. 6 is a block diagram of a wavelength division multiplexing (WDM) communication system utilizing an embodiment of partial FWM compensation logic 170PF. Post-compensation is performed in the digital domain after coherent detection. Transmitter 610 includes optical modulators 110 which modulate optical signals $\lambda_1$ through $\lambda_N$ according to (electrical) data signals $d_1$ to $d_N$. Multiplexer 120 performs wavelength-division multiplexing on the modulated optical signals. The WDM signal is transmitted over M (amplified) optical fiber spans 620. It should be appreciated that various technologies and mechanisms can be used for amplification and modulation.

A receiver 630 mixes the signal in a 90° optical hybrid 640 with a set of phase-locked local oscillators 650, since FWM is sensitive to inter-channel relative phase. After demultiplexing (block 660), a set of balanced photo-detectors 670 obtains in-phase and quadrature components of each WDM channel. The I and Q components are provided to complex field reconstructor 680, which produces the complex form of the signal for each channel, $\hat{E}_1 \ldots \hat{E}_N$ ($E_j = I_j + iQ_j$). Partial FWM compensation logic 170PF uses the techniques described above to model for partial FWM compensation and produce $\hat{E}_{1out} \ldots \hat{E}_{Nout}$. The originally transmitted data $d_1$ to $d_N$ is recovered then recovered through phase estimation (block 690).

Figure 7:
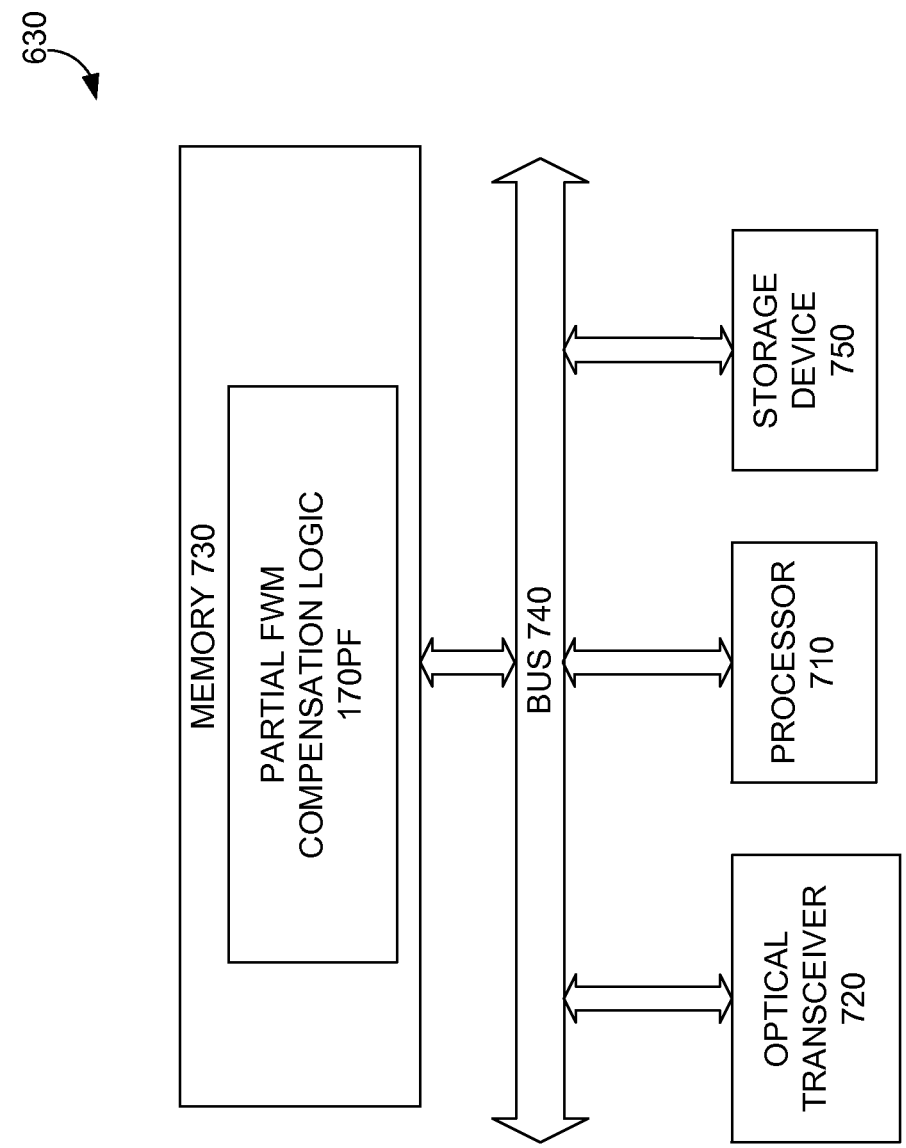
FIG. 7 is a hardware block diagram of the receiver of FIG. 5, according to some embodiments.

FIG. 7 is a hardware block diagram of an embodiment of receiver 630. Receiver 630 contains a number of components that are known in the electronics and computer arts, including a processor 710 (e.g., microprocessor, digital signal processor, microcontroller, digital signal controller), an optical transceiver 720, and memory 730. These components are coupled via a bus 740. Some embodiments also include a storage device 750, such as non-volatile memory or a disk drive. Omitted from FIG. 7 are a number of conventional components that are unnecessary to explain the operation of receiver 630.

In the embodiment of FIG. 7, partial FWM compensation logic 170PF resides in memory 730 as instructions which, when executed, implement systems and methods of partial FWM impairment compensation as described herein. In other embodiments (not shown), partial FWM compensation logic 170PF is implemented in specialized hardware logic, including, but not limited to, a programmable logic device (PLD), a programmable gate array (PGA), a field programmable gate array (FPGA), an application-specific integrated circuit (ASIC), a system on chip (SoC), and a system in package (SiP). Such digital logic implementations are not limited to pure digital but may also include analog sections or components.

Partial FWM compensation logic 170PF can be embodied in any computer-readable medium for use by or in connection with a processor. In the context of this disclosure, a "computer-readable medium" can be any means that can contain or store the instructions for use by the processor. The computer readable medium can be, for example but not limited to, a system or that is based on electronic, magnetic, optical, electromagnetic, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of compensating for transmission impairment, the method comprising:
   receiving a wavelength-division multiplexed optical signal which has been distorted in the physical domain by an optical transmission channel, wherein the optical transmission channel includes an optical fiber and an optical amplifier; and
   propagating the distorted optical signal backward in the electronic domain in a corresponding virtual optical transmission channel to fully compensate for fiber dispersion, self-phase modulation, and cross-phase modulation (XPM) and to partially compensate for four-wave mixing (FWM),
   the virtual optical transmission channel includes a virtual optical fiber,
   the method further comprising modeling the virtual optical fiber according to an enhanced coupled non-linear Schrödinger equation (EC-NLSE) using dispersion, loss and nonlinearity parameters which are opposite in value to the corresponding optical fiber parameters, to account for dispersion, intra-channel, and at least some inter-channel impairments.

2. The method of claim 1, wherein the propagating partially compensates for four-wave mixing (FMW)n a channel-by-channel basis by considering nonlinear interaction of neighboring channels.

3. The method of claim 1, wherein the propagating is decomposed into a series of steps.

4. The method of claim 3, wherein the propagating includes performing a sum operation at each sub-step in the series of steps to include a contribution on each channel of a plurality of channels, the contribution resulting from four-wave mixing (FMW).

5. The method of claim 1, further comprising:
   solving the EC-NLSE using a split-step Fourier method.

6. The method of claim 5, wherein the propagating includes performing a sum operation at each sub-step in the split-step Fourier method to include a contribution on each channel of a plurality of channels, the contribution resulting from four-wave mixing (FMW).

7. The method of claim 5, wherein the propagating includes an XPM calculation to calculate a contribution of each channel of a plurality of channels, the contribution resulting from cross-phase modulation (XPM).

8. The method of claim 7, wherein the cross-phase modulation (XPM) calculation is preceded by a fast Fourier transform and succeeded by an inverse fast Fourier transform.

9. A receiver comprising:
   memory containing instructions stored thereon;
   a processor; and
   an optical detector configured to receive a wavelength-division multiplexed optical signal which has been distorted in the physical domain by an optical transmission channel and further configured to provide a corresponding distorted electrical signal to the processor, wherein the optical transmission channel includes an optical fiber and an optical amplifier,
   wherein the processor is configured by the instructions to:
      propagate the distorted electrical signal backward in the electronic domain in a corresponding virtual optical transmission channel that includes a virtual optical fiber and a virtual attenuator, to fully compensate for fiber dispersion, self-phase modulation, and cross-phase modulation (XPM) and to partially compensate for four-wave mixing (FWM);

model the virtual optical fiber according to an enhanced coupled non-linear Schrödinger equation (EC-NLSE) using dispersion, loss and nonlinearity parameters which are opposite in value to the corresponding optical fiber parameters, to account for dispersion, intra-channel, and at least some inter-channel impairments; and model the virtual attenuator with an attenuation parameter that balances the gain of the corresponding optical amplifier.

10. The receiver of claim 9, wherein the processor is further configured to:

during propagation, partially compensate for four-wave mixing (FMW) on a channel-by-channel basis by considering nonlinear interaction of neighboring channels.

11. The receiver of claim 9, wherein the propagating includes performing a sum operation at each sub-step in the series of steps to include a contribution on each channel of a plurality of channels, the contribution resulting from four-wave mixing (FMW).

12. A receiver comprising:

memory containing instructions stored thereon;

a processor; and an optical detector configured to receive a wavelength-division multiplexed optical signal which has been distorted in the physical domain by an optical transmission channel and further configured to provide a corresponding distorted electrical signal to the processor, wherein the processor is configured by the instructions to:

decompose the propagation into a series of steps;

solve the EC-NLSE using a split-step Fourier method; and propagate the distorted electrical signal backward in the electronic domain in a corresponding virtual optical transmission channel to fully compensate for fiber dispersion, self-phase modulation, and cross-phase modulation (XPM) and to partially compensate for four-wave mixing (FWM).

13. The receiver of claim 12, wherein a dispersive walk-off effect is taken into account in solving the enhanced coupled non-linear Schrödinger equation(EC-NLSE).

14. The receiver of claim 12, wherein the propagating includes an cross-phase modulation (XPM) calculation to calculate a contribution of each channel of a plurality of channels, the contribution resulting from XPM.

15. A method of compensating for transmission impairment, the method comprising:

receiving a wavelength-division multiplexed optical signal which has been distorted in the physical domain by an optical fiber;

modeling a virtual optical fiber according to a non-linear Schrödinger equation (NLSE) to account for dispersion, intra-channel impairments, and at least some inter-channel impairments, the virtual optical fiber corresponding to the optical fiber, the modeling using dispersion, loss and nonlinearity parameters which are opposite in value to corresponding optical fiber parameters; and performing backward propagation on the distorted optical signal by solving the NLSE while taking into account a dispersive walk-off effect, wherein the NLSE is an enhanced coupled NLSE (EC-NLSE).

* * * * *